April 5, 1932. K. E. PEILER 1,852,218
METHOD OF AND APPARATUS FOR FEEDING MOLTEN GLASS
Filed Nov. 7, 1925 2 Sheets-Sheet 1

Inventor:
Karl E. Peiler
by Robson & Brown
Atty.

April 5, 1932. K. E. PEILER 1,852,218
METHOD OF AND APPARATUS FOR FEEDING MOLTEN GLASS
Filed Nov. 7, 1925 2 Sheets-Sheet 2

Inventor:
Karl E. Peiler
by Robson D. Brown
Atty.

Patented Apr. 5, 1932

1,852,218

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed November 7, 1925. Serial No. 67,574.

My invention relates to the art of feeding molten glass, and more particularly to the separation of molten glass into mold charges for use in glassware shaping machines.

The invention has particular reference to glass feeders in which the glass is discharged from an outlet in a container under the influence of forces acting on the glass in the container, and the primary object of my invention is to provide a method and apparatus for utilizing centrifugal force as an agent for controlling the rate at which the glass is discharged.

This object is accomplished by providing an implement which projects into the glass near the container outlet, and rotating the implement at constant or periodically varying speed, so as to cause a rotative movement of the glass adjacent to the outlet, this movement developing sufficient centrifugal force in the glass to counteract the natural force of gravity and thereby to retard, or even reverse, the movement of the glass in and below the outlet.

In utilizing the apparatus as a stream feeder, the rate of discharge is controlled by maintaining constant centrifugal force on the glass by rotating the implement at a uniform but adjustable speed. The apparatus may also be caused to deliver glass intermittently in the form of mold charges of predetermined size and and shape, in which case the contrifugal force exerted on the glass at the outlet is periodically varied to regulate the size and shape of the charges. Such periodic variation of centrifugal force applied to the glass may be obtained by advancing and retarding the implement, rotating at uniform speed, toward and from the outlet; or by maintaining the implement at a constant distance from the outlet and periodically varying the rotational speed thereof in accordance with the required centrifugal forces necessary to interrupt the discharge.

Another object of the invention is to provide a glass feeder of the character designated in which a portion of the glass in the container is rotated prior to being discharged from the outlet, and is thereby mixed and rendered thoroughly homogeneous.

Figure 1:
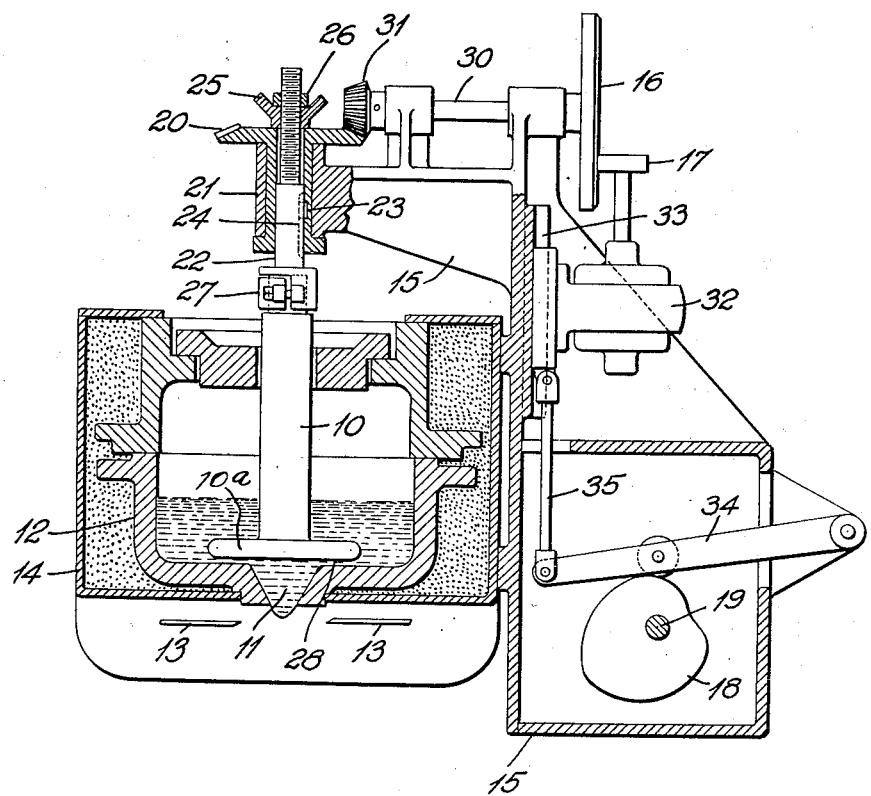
Figure 2:
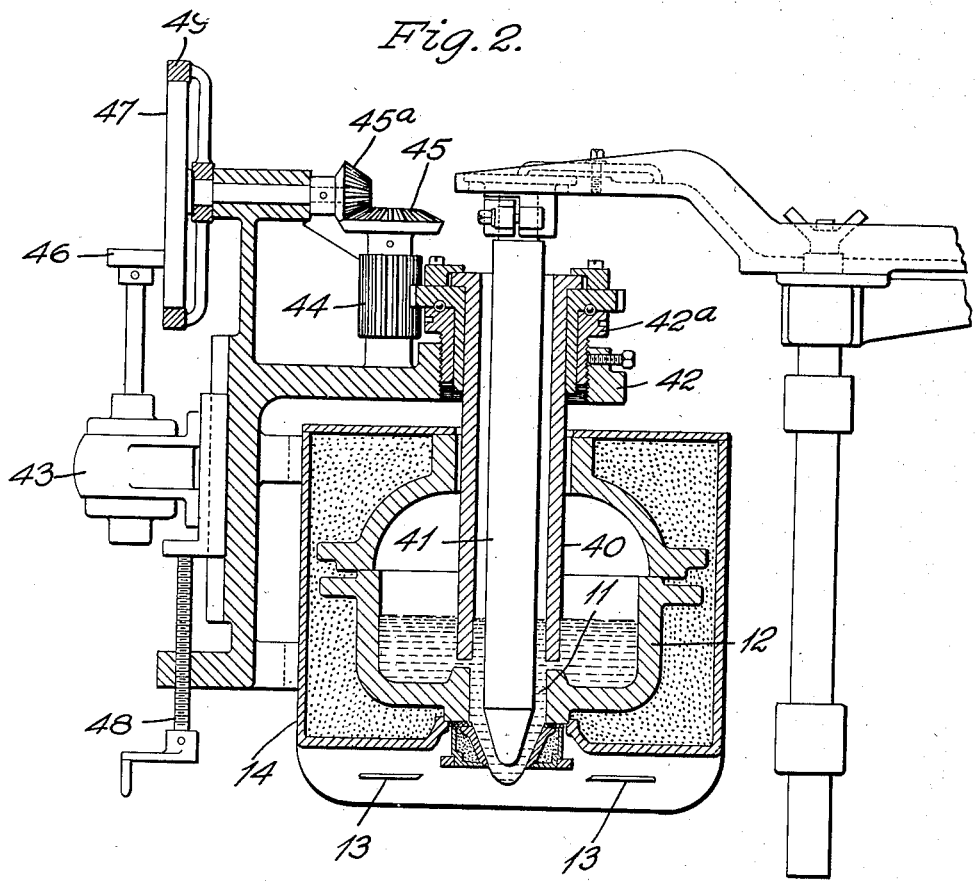

These and other objects will be more manifest from the following specification, taken in connection with the accompanying drawings, in which Figure 1 is a view in elevation, showing parts in section, of a centrifugal glass feeding apparatus constructed in accordance with the present invention; and Fig. 2 is a similar view of a modification in which a rotary tube is employed as the centrifugal member and is arranged to cooperate with a reciprocable plunger in discharging mold charges of predetermined size and shape.

In Fig. 1 of the drawings, there is shown a glass feeder arranged to feed mold charges of glass by means of a rotary implement 10 positioned near, and in axial alignment with, an outlet 11 located in the bottom of a container 12, which may be a forehearth connected to a glass melting tank, not shown. The discharged glass is separated into mold charges by cooperating shear blades 13—13. The container 12 is enclosed in a metalic casing 14 which may serve to retain heat-insulating material and also to provide a support for the feeder operating mechanism which is carried by a suitable frame 15 mounted on the casing.

Centrifugal force for controlling the rate at which the glass is discharged from the outlet 11 is developed by rotating the implement 10 at a speed which may be varied to produce the desired feeding results. These speeds may be obtained by any suitable speed-change device, as for example by a friction device, which includes a large disc 16 operatively connected to the implement 10 and a relatively small driving disc 17 operated from an independent source of power as more fully described below. In this device, different speeds are imparted to the implement 10 by moving the driving disc 17 radially with respect to the driven disc 16, thus causing the implement to set up the desired centrifugal forces in the glass.

The mechanism for supporting and rotating the implement 10 includes a bevel gear 20 mounted in a bearing 21 on the feeder frame. The implement 10 may be adjusted vertically, so as to change its position relative to the outlet, in any suitable manner as, for example, by splining a rod 22 to the hub of the bevel gear 20 by a key 23 and a keyway 24 formed in the rod. The upper portion of the rod 22 protrudes through the bevel gear 20 and is threaded to receive a wing nut 25 and an associated set nut 26. The implement 10 is secured to the lower end of the rod 21 by a chuck 27. Thus the implement may be raised or lowered relative to the outlet, to adjust the size of the flow passage between the implement and the walls of the outlet. The implement 10 is shown as having an enlarged lower portion 10ᵃ which provides for an annular flow passage 28 to conduct the glass to the outlet from the supply in the container. This enlargement better enables the implement to exert the desired rotative effect on the glass adjacent to the implement and the outlet, and thereby more accurately controls the discharge of the glass.

As stated above, the various speeds at which the implement is rotated, are obtained by a friction speed-change mechanism in which the driving disc is moved radially of the driven disc. In the illustrated embodiment of the invention, the driven disc 16 is mounted on a shaft 30 which connects with the bevel gear 20 through a gear 31, and the driving friction disc 17 is connected directly to a suitable power unit indicated at 32, which may be a constant speed motor. This power unit is mounted for reciprocatory motion in suitable guideways 33 and is reciprocated by a cam 18 which acts through a pivotally mounted cam roll lever 34 and a link 35 connected to the power unit support. The cam 18 is rotated by a power shaft 19, which may also serve to drive the operating mechanism of the shears 13. Such shear-operating mechanism may be similar to that shown and described in my Patent No. 1,760,254, granted May 27, 1930.

In the operation of the apparatus described above, the glass in the container flows to the outlet 11 through the open passage 28, and the normal gravity flow may be regulated by changing the size of the flow passage by the vertical adjustment of the implement 10. Proper flow of glass from the outlet is further controlled by rotating the implement so that the glass in the container near the outlet is rotated. This rotation of the glass around the outlet has two principal effects, namely, to mix the glass thoroughly and to develop sufficient centrifugal force to modify substantially the rate at which the glass is discharged from the outlet.

Having thus adjusted the implement to establish the desired flow of glass, the issuing glass is preferably formed into suspended mold charges of the desired size and shape by periodically increasing and decreasing, or even stopping, the rotational speed of the implement to apply, at regular intervals, the required centrifugal forces to counteract, either partly or completely, the gravitational forces acting on the glass. In the intervals between the maximum and minimum development of centrifugal force, the speed of the implement may be varied as desired, by suitably shaping the cam 18, so as to control the shape of the upper, lower and intermediate parts of each individual mold charge. It will be obvious that the rate at which any part of a mold charge issues from the outlet, and consequently the diameter of that part of the charge, depends upon the extent to which the normal gravity flow is reduced by the action of centrifugal force. By thus varying the centrifugal forces acting on the glass during the delivery of a mold charge, I am able to obtain much the same effects, in shaping the charge, as are produced by a vertically reciprocating plunger in the feeder shown in my above-mentioned Patent No. 1,760,254.

I have shown and described a convenient mechanism for imparting variable speeds to the rotary implement, but it is obvious that any other system of speed change devices may be employed for this purpose.

In the modification shown in Fig. 2, the rotary implement is shown as a tube 40 surrounding a reciprocable plunger 41, projecting into the container 12 in axial alignment with the outlet 11. The plunger 41 may be mounted and reciprocated as shown in my above-mentioned Patent No. 1,760,254. The tube 40 is mounted in a stationary bracket 42 by means of a screw-threaded collar 42a. The tube may thus be vertically adjusted relative to the outlet to regulate the size of the mold charges, but this regulation is secondary to the speed of rotation of the tube in controlling the rate of discharge of glass from the feeder outlet. The tube is rotated from a motor 43, or other suitable source of power, by gears 44, 45, and 45a, which are driven by friction discs 46 and 47 arranged and operated in a manner similar to the speed-change device shown in Fig. 1. The motor 43 carrying the friction drive gear 46 is moved relative to the driven disc 47 by a manually operated adjusting device 48 attached to the feeder frame, which moves the motor in suitable ways so as to move the driving disc 46 toward and from the center of the disc 47. If it is desired to stop the rotation of the tube 40, the disc 46 may be lowered until it passes off the disc 47 upon a freely rotatable ring 49 in the same plane as the disc 47.

The structural details for rotatably mounting the tube 40 are substantially as set forth in my Patent No. 1,735,837, granted Nov. 12, 1929, and are therefore not described in detail herein.

In operating the apparatus of Fig. 2, the amount of glass admitted to the outlet is controlled by maintaining the tube at a suitable distance from the outlet, and by rotating the tube so as to set up sufficient centrifugal forces to counteract the force of gravity to the desired extent. In such apparatus, the shape imparted to the issuing charges is determined by the reciprocation of the plunger 40, in the manner set forth in my Patent No. 1,760,254.

Another variant form of this invention consists in providing a solid implement, like the headed implement 10 of Fig. 1 or the tapering-ended implement 41 of Fig. 2, and rotating this implement constantly in the glass without vertical movement of the implement. Such an arrangement is suitable for delivering the glass in a constant stream, at a rate which may be accurately controlled by adjusting the speed of rotation of the implement. Such speed-changing means may be similar to the manual speed-changing device shown in Fig. 2 for operating the tube 40.

In both of the structures herein shown, the rotary flow-controlling implements occupy the same general position relative to the forehearth outlet and produce the same rotative movement of the glass, which, in addition to developing forces in the glass that are effectively utilized to control its flow from the outlet, serve to thoroughly mix the glass just prior to its discharge and cause it to be delivered in a homogeneous state.

I am aware that glass feeders have heretofore been provided with rotary implements which, by their rotation, impart rotary movement to the glass for the purpose of mixing the glass and increasing its homogeneity. The present invention adds to this mixing effect the further effect of centrifugal force which, although theoretically present to a small extent in the prior rotary-implement devices, has not heretofore been employed to produce any useful result.

I claim as my invention:

1. The method of feeding molten glass from an outlet in a stationary container, which comprises establishing a gravity flow of glass from the outlet and retarding the flow by centrifugal force applied to the glass by rotating an internal portion of the body of glass within the container about the axis of the outlet at a speed sufficient periodically to overcome the action of gravity.

2. The method of discharging mold charges from a container having a submerged outlet and a flow-controlling implement arranged to cooperate with a wall of the container to form a passageway communicating with the outlet, which comprises the steps of causing glass to flow from the source of supply in the container through the passageway and through the outlet, maintaining a movement of a wall of said passageway in a direction to apply a force to the issuing glass in opposition to the force of gravity, periodically increasing the speed of movement of the wall to temporarily stop the gravity flow of glass from the outlet and periodically severing the issued glass.

3. In apparatus for feeding molten glass, the combination of a container for the glass having a submerged outlet opening in the bottom thereof, a rotary implement extending downward into the glass over the outlet, and means to rotate said implement about a vertical axis at a speed sufficient periodically to overcome by centrifugal force the effect of gravity on the glass at the outlet.

4. In apparatus for feeding molten glass, the combination of a container for molten glass having a submerged outlet, mechanical means operating by a continuous movement within the glass to apply a restraining force effective periodically to practically stop the flow of glass through the outlet, means for periodically applying an expelling force to the glass in the container, and means for periodically severing the issuing glass.

5. Apparatus for separating molten glass into mold charges, comprising a container having a submerged outlet, a rotary flow-controlling implement projecting into the glass in axial alignment with the outlet, said implement being adapted to apply a centrifugal action to the glass at the outlet for controlling flow of glass through the outlet, means for periodically varying the centrifugal action by changing the speed of rotation of the implement without change of direction of rotation of the implement, whereby mold charges of glass periodically issue from the outlet, and means for periodically severing the issuing glass.

6. The method of forming a mold charge of molten glass from a container having a submerged discharge outlet which comprises controlling the issuance of glass from the outlet by rotating an implement having an end larger in diameter than the outlet and immersed in the glass above the outlet at a speed less than that sufficient to overcome the extrusive action of gravity, increasing the speed of rotation of the implement to impart to the glass centrifugal force sufficient to overcome the gravity action, and severing the charge so formed.

7. The method of feeding molten glass in mold charges performed while suspended from an outlet of a glass container, which comprises causing the glass to flow through the outlet by gravity, applying to the glass above the outlet a periodically varying centrifugal force without rotating the container to vary the rate of issuance of glass through the outlet so that the suspended glass is given a predetermined shape, and periodically separating the shaped glass from the glass in the container.

8. The method of forming mold charges of molten glass issuing by gravity from a submerged outlet of a non-rotating glass container which comprises causing a centrifugal force in the molten glass above the outlet sufficient to retard the gravity flow of glass through the outlet, varying the centrifugal force to effect shaping of the glass suspended from the outlet, said centrifugal force having a maximum flow retarding effect when the glass suspended from the outlet has attained a desired shape, and then being effective to interrupt said flow, and severing the shaped glass below the outlet at a time related to the time of application of the maximum centrifugal force above the outlet.

9. The method of forming mold charges of molten glass which comprises discharging glass through an outlet of a container under the force of gravity modified by centrifugal force set up in the glass above the outlet by the rotation of an implement in the glass, varying the size of different mold charges by varying the position of the rotating implement in the glass relatively to the outlet, and severing the charges so formed.

10. In apparatus for feeding molten glass, the combination of a container for the glass having a submerged outlet opening in the bottom thereof, a rotary implement extending downward into the glass over the outlet, and means to rotate said implement about a vertical axis at a speed sufficient to oppose by centrifugal force the effect of gravity on the glass at the outlet, said implement having an enlarged disk-like lower end portion having its diameter equal to or greater than twice the diameter of the portion of the implement above said disk-like portion.

11. In a method of feeding molten glass from a submerged outlet of a glass container to produce mold charges periodically severed from molten glass issuing by gravity from the outlet, the step which comprises rotating an implement immersed in the glass in such manner as to periodically cause a centrifugal force on the glass in the container adjacent to the outlet sufficient to retract the glass stubs after the mold charges have been severed therefrom.

12. In a method of feeding molten glass from a glass container by causing molten glass to flow from the container through a submerged outlet of the container, the step of causing a periodic reversal of direction of movement of the molten glass suspended from the outlet by a centrifugal force applied periodically to the interior of the glass in the container by rotating an implement immersed in the glass in the container in substantial alignment with the outlet.

13. The method which consists in causing molten glass to flow by gravity from an outlet in a container and periodically rotating a portion of the body of glass within the container about the axis of the outlet by a force applied directly to the glass adjacent to the outlet and at a speed to overcome the action of gravity and thereby arrest the discharge of glass.

14. The method which consists in causing molten glass to flow by gravity from an outlet opening in the bottom of a container, rotating an implement within the glass about the axis of the outlet and thereby producing a rotative movement of a portion of the glass adjacent the outlet, and periodically increasing the speed of rotation sufficiently to thereby overcome the action of gravity.

15. The method which consists in causing glass to flow from a supply body through a passageway and downward through an outlet, maintaining a continuous movement of one of the walls of said passageway with respect to the opposite wall thereof and in a direction to apply a force to the issuing glass in opposition to the force of gravity, said applied force being periodically varied in degree and sufficient to substantially overcome the force of gravity and stop the flow through said outlet.

Signed at Hartford, Conn., this 4th day of November, 1925.

KARL E. PEILER.